Oct. 30, 1934.     Á. B. NAGY     1,978,756
MACHINE FOR MANUFACTURING CAPSULES
Filed Dec. 30, 1933

INVENTOR:
Árpád Béla Nagy
BY
ATTORNEY

Patented Oct. 30, 1934

1,978,756

UNITED STATES PATENT OFFICE 1,978,756

MACHINE FOR MANUFACTURING CAPSULES

Árpád Béla Nagy, Budapest, Hungary, assignor to Kork-N-Seal Limited, London, England, a British company Application December 30, 1933, Serial No. 704,730
In Hungary January 9, 1933

12 Claims. (Cl. 113—52)

This invention relates to machines for manufacturing metal capsules for closing or sealing bottles and other containers and has particular reference to the stretching means or apparatus employed in such machines. Such stretching means are employed for forming capsules of adequate length by stretching the blanks or work pieces which, by a previous drawing or shaping operation, have been brought from plane circular sheets or discs into the shape of cups of shallow depth.

The stretching means heretofore employed lack perfection principally in three respects. One of their deficiencies is that the stretching spindle rotates not only during the stretching operation but continuously, also while the finished capsule is being stripped off, with the result that the capsule to which rapid rotation is imparted is thrown by the centrifugal force developed in an uncontrollable or uncertain direction so that it is very difficult to recover the same in an undamaged condition. Heretofore, attempts were made to overcome this deficiency by pressing a brake shoe onto the capsule whilst being stripped, which, however, if applied with slight pressure did not have sufficient retarding effect, and if pressed with greater pressure against the capsule, often damaged or destroyed the latter. Considerable difficulty has also been experienced in the proper timing of the brake. Fences were also placed around the stretching spindle to catch the capsule thrown off, but the capsules were often damaged owing to their hitting against the fences and difficulties were experienced in so forming the fences as to lead the capsules to a predetermined collecting point. According to one feature of the present invention, these difficulties are overcome by providing for the rotation of the stretching spindle to be stopped for the duration of the stripping operation by the throwing out of a clutch.

Another deficiency of the stretching apparatus heretofore employed resides in this that the stripping device was spring-operated and its operation was unreliable, with the result that the capsules were piled up on the stretching spindle causing, on the one hand, waste of material, while, on the other hand, the whole machine had to be stopped to remove them. According to another feature of the present invention, these difficulties are overcome by the employment of a stripping device in the form of a sleeve which is slidable upon the stretching spindle and is positively moved in the direction of stripping. In addition, the complete removal, without a remainder, of capsules broken to pieces may also be insured by employing an additional pushing member movable in an opening provided in the stretching spindle and acting upon the bottom of the capsule.

The invention also removes a third deficiency of the stretching apparatus hitherto employed consisting in this that their efficiency was considerably less than that of the efficiency of the apparatus employed for performing the preceding operations in the manufacture of the capsules, and the disadvantages of which were noticeable to a still higher degree in cases where all the operations of capsule manufacturing were performed by one machine. That is to say, since the work pieces pass in succession through the apparatus performing the different operations, owing to the minor efficiency of the stretching apparatus, the major efficiency of the preceding operations must remain unutilized. According to another feature of the present invention, the efficiency of the stretching apparatus is increased by the provision of means for moving the stretching roller at a higher speed in its idle stroke than its working stroke. Thus, the increase of efficiency is in no way detrimental to the quality of work, because the time employed for stretching is not shortened.

In order that the said invention may be clearly understood and readily carried into effect, the same will now be more fully described with reference to the accompanying drawing in which:—

Figure 1:
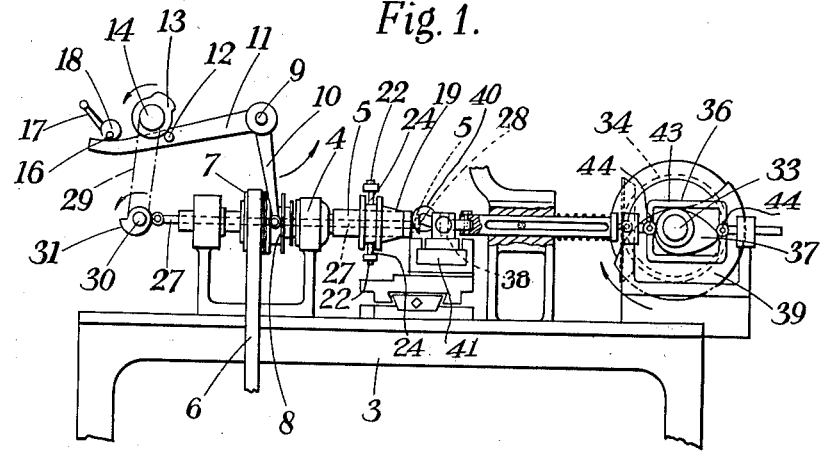
Fig. 1 is a side elevation.
Figure 2:
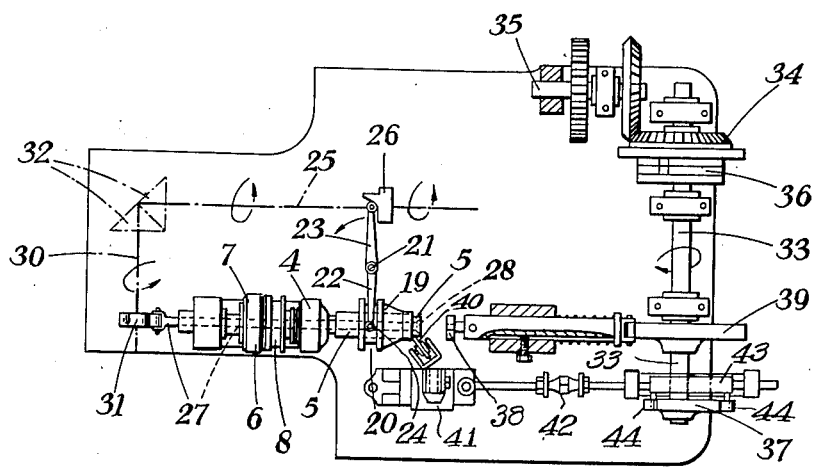
Fig. 2 is a plan view of a stretching apparatus and its driving mechanism embodying the invention.

In the accompanying drawing the stretching spindle 5 is journalled in a bearing 4 secured to the machine frame 3 and receives rotation from a pulley 7 driven by a belt 6 through the intermediary of a clutch 8. In operation, the rotation of the stretching spindle 5 is discontinued by throwing out the clutch 8 whenever a stretching operation is finished. The clutch is thrown out by the arm 10 of a two armed lever pivoted on a pin 9 secured to the machine frame, whenever the other arm 11 of the lever is depressed by a cam 13 which acts upon a pin 12 of the arm 11. The said cam is preferably keyed to the shaft 14 of the capsule manufacturing machine from which the drawing punch which forms a cup from the plane metal sheet is moved. By means of an eccentric 18 which may be turned about a stationary shaft 16 by a hand crank 17, the clutch 8 may, when necessary, be kept in its thrownout position for a longer period of time.

The stripping device is indicated at 19 and consists of a sleeve axially shiftable upon the stretching spindle 5. For the purpose of imparting positive movement in the direction of stripping to the stripping device, pegs 24 are provided at the ends of a forked arm 22 of a two armed lever pivoted upon a stationary pin 21 so that they engage with a recess 20 in the sleeve which rotates with the spindle. As soon as the stretching operation is completed, the other arm 23 of the two armed lever is swung in the direction of the arrow by a cam on a cam disc 26 keyed to the shaft 25, whereby the stripper 19 is pushed so far to the right by the fork 22 that its right edge will come beyond the right edge of the stretching spindle so that the capsule finished by stretching on the spindle is positively stripped off. The disc 26 is so shaped as not to prevent the sleeve 19 from sliding to the left during the stretching operation.

In the constructional form of the stretching apparatus as shown by way of example, another positively moved pushing member 27 is provided so that it is located in the bore of the stretching spindle 5 and has a head 28 in contact with the bottom of the capsule. This pushing member 27, which is operated by a cam 31 keyed to a shaft 30 driven by chain transmission 29 from the shaft 14, insures thorough clearing of the stretching spindle each time after the stretching of a work piece even if the capsule become so destroyed that its bottom is separated from its side portion. The shaft 25 of the cam disc 26 is driven from shaft 30 of the cam 31 by means of a bevel gear transmission 32.

The stretching roller 40 is slidably mounted on a support 41 for movement axially of spindle 5. Reciprocating motion is transmitted to the roller by means of adjustable link 42 which is reciprocated by a sliding cross-head 43 provided with cam follower rollers 44 engaging cam 37.

In the constructional form as shown, the stretching roller 40, which co-operates with the stretching spindle 5, is given a much higher speed in its idle stroke than the speed at which it performs its working stroke in such a manner that the shaft 33 from which the stretching roller receives its reciprocatory movement along the stretching spindle 5 is rotated at an angular velocity varying within one revolution. For this purpose, a driving mechanism 36 of the known revolving link block type has been inserted between shaft 33 and the bevel wheel 34 which is rotated at uniform speed by a shaft 35, and the cam 37 by which the stretching roller is reciprocated, has been so keyed on the shaft 33 rotating at variable speed that the angular velocity of that peripheral portion of the cam moving the stretching roller 40 in its working stroke i. e. from right to left along the stretching spindle 5 is lower, and the angular velocity of that peripheral portion of the cam moving the stretching roller in the backward direction, i. e., from left to right, is higher than that of bevel wheel 34. It will be understood that a similar movement of the stretching roller may be obtained within the scope of the invention by any other known driving mechanism.

The rubber disc 38 by which the work piece is pushed onto the stretching spindle 5 and retained thereon is reciprocated also by the shaft 33 by means of a cam 39.

Having thus described my invention what I claim as new therein and desire to secure by Letters Patent is:—

1. A machine for manufacturing capsules for applying to bottles and other containers comprising a rotary stretching spindle used as a mandrel, a stretching roller reciprocated longitudinally of, and cooperating with, said spindle, a stripping device reciprocated also longitudinally of the stretching spindle, mechanism for automatically stopping the rotation of the stretching spindle for the period of the stripping operation and means for positively moving the stripping device in the direction of stripping.

2. A machine for manufacturing capsules for applying to bottles and other containers comprising a rotary stretching spindle used as a mandrel, a stretching roller reciprocated longitudinally of, and cooperating with, said spindle, a stripping device reciprocated also longitudinally of the stretching spindle, a clutch for automatically stopping the rotation of the stretching spindle for the period of the stripping operation and means for positively moving the stripping device in the direction of stripping.

3. A machine for manufacturing capsules for applying to bottles and other containers comprising a rotary stretching spindle used as a mandrel, a stretching roller reciprocated longitudinally of, and cooperating with, said spindle, a stripping sleeve slidable on the stretching spindle, mechanism for automatically stopping the rotation of the stretching spindle for the period of the stripping operation and means for positively moving the stripping sleeve in the direction of stripping.

4. A machine for manufacturing capsules for applying to bottles and other containers comprising a rotary stretching spindle used as a mandrel, a stretching roller reciprocated longitudinally of, and cooperating with, said spindle, a stripping device reciprocated also longitudinally of the stretching spindle, mechanism for automatically stopping the rotation of the stretching spindle for the period of the stripping operation, means for positively moving the stripping device in the direction of stripping and a pushing member slidable in a longitudinal opening formed in the stretching spindle and bearing with a head against the bottom of the capsule.

5. A machine for manufacturing capsules for applying to bottles and other containers comprising a rotary stretching spindle used as a mandrel, a stretching roller reciprocated longitudinally of, and cooperating with, said spindle, mechanism for automatically stopping the rotation of the stretching spindle for the period of the stripping operation, a stripping sleeve slidable on the stretching spindle, and cam means for positively moving the stripping sleeve in the direction of stripping.

6. A machine for manufacturing capsules for applying to bottles and other containers comprising a rotary stretching spindle used as a mandrel, a stretching roller reciprocated longitudinally of, and cooperating with, said spindle, mechanism for automatically stopping the rotation of the stretching spindle for the period of the stripping operation, a stripping sleeve slidable on the stretching spindle, a capsule pushing member slidable in an opening formed in the stretching spindle, cam means for positively moving the stripping sleeve in the direction of stripping and further cam means for positively moving the capsule pushing member.

7. A machine for manufacturing capsules for applying to bottles and other containers comprising a rotary stretching spindle used as a mandrel, a stripping sleeve slidable on the stretching spindle, a pushing member slidable in an opening formed longitudinally of the stretching spindle, said pushing member being arranged to bear against the bottom of the capsule, and means for positively moving the stripping sleeve in the direction of stripping and means for positively moving the said pushing member in the same direction.

8. A machine for manufacturing capsules for applying to bottles and other containers comprising a rotary stretching spindle used as a mandrel, a stretching roller reciprocated longitudinally of, and cooperating with, said spindle, a stripping device reciprocated also longitudinally of the stretching spindle, and a driving mechanism reciprocating the stretching roller along the stretching spindle at a higher speed in its idle stroke than the speed of its working stroke.

9. A machine for manufacturing capsules for applying to bottles and other containers comprising a rotary stretching spindle used as a mandrel, a stretching roller reciprocated longitudinally of, and cooperating with, said spindle, a stripping device reciprocated also longitudinally of the stretching spindle, mechanism for automatically stopping the rotation of the stretching spindle for the period of the stripping operation and means for reciprocating the stretching roller along the stretching spindle at a higher speed in its idle stroke than the speed of its working stroke.

10. A machine for manufacturing capsules for applying to bottles and other containers comprising a rotary stretching spindle used as a mandrel, a stretching roller reciprocated longitudinally of, and cooperating with, said spindle, a stripping sleeve slidable on the stretching spindle, means for positively moving the stripping sleeve in the direction of stripping and means for reciprocating the stretching roller along the stretching spindle at a higher speed in its idle stroke than the speed of its working stroke.

11. A machine for manufacturing capsules for applying to bottles and other containers comprising a rotary stretching spindle used as a mandrel, a stretching roller reciprocated longitudinally of, and cooperating with, said spindle, a stripping sleeve slidable on the stretching spindle, a clutch for automatically stopping the rotation of the stretching spindle for the period of the stripping operation, cam means for positively moving said sleeve in the direction of stripping and means for reciprocating the stretching roller along the stretching spindle at a higher speed in its idle stroke than the speed of its working stroke.

12. A machine for manufacturing capsules for applying to bottles and other containers comprising a rotary stretching spindle used as a mandrel, a stretching roller reciprocated longitudinally of, and cooperating with, said spindle, a stripping sleeve slidable on the stretching spindle, a clutch for automatically stopping the rotation of the stretching spindle for the period of the stripping operation, a capsule pushing member slidable in an opening formed longitudinally in the stretching spindle, cam means for positively moving said sleeve in the direction of stripping, means for moving the capsule pushing member in the same direction and means for reciprocating the stretching roller along the stretching spindle at a higher speed in its idle stroke than the speed of its working stroke.

ÁRPÁD BÉLA NAGY.